J. H. IMUS.
POTATO PLANTER.
APPLICATION FILED FEB. 19, 1916.
1,322,574.
Patented Nov. 25, 1919.
2 SHEETS—SHEET 1.
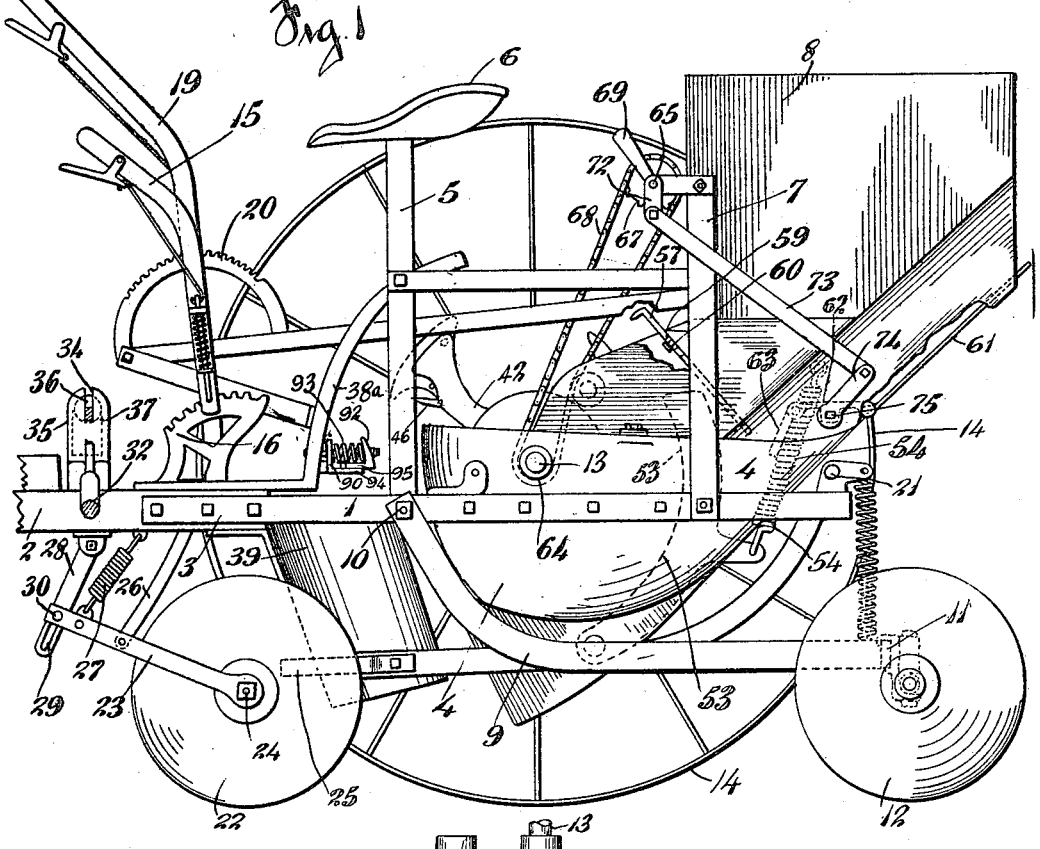
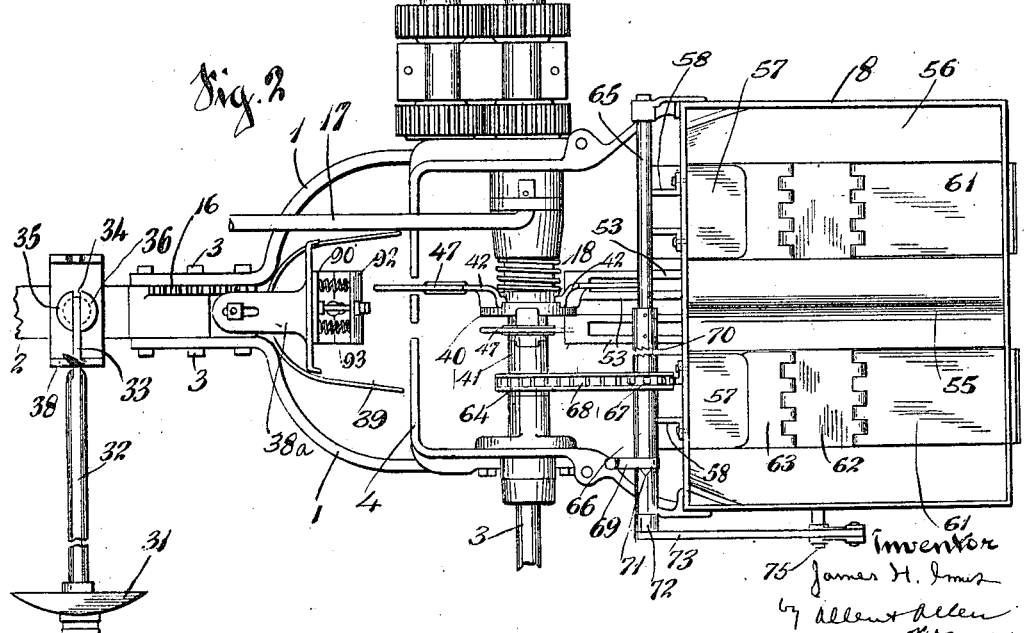

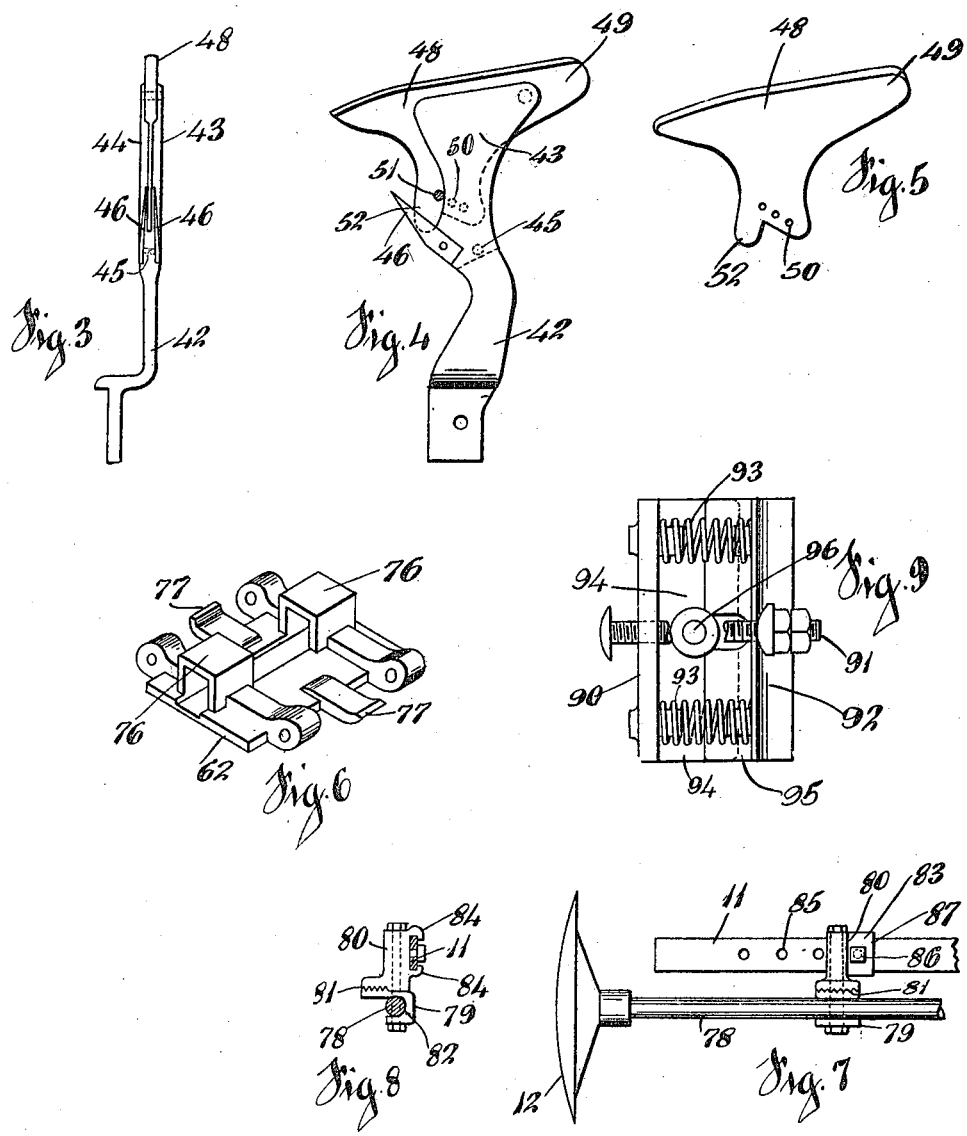

UNITED STATES PATENT OFFICE.

JAMES H. IMUS, OF DAYTON, OHIO, ASSIGNOR TO THE OHIO RAKE COMPANY, OF DAYTON, OHIO, A CORPORATION OF OHIO.

POTATO-PLANTER.

1,322,574.  Specification of Letters Patent.  Patented Nov. 25, 1919.

Application filed February 19, 1916. Serial No. 79,248.

*To all whom it may concern:*

Be it known that I, JAMES H. IMUS, a citizen of the United States, and a resident of the city of Dayton, in the county of Montgomery and State of Ohio, have invented certain new and useful Improvements in Potato-Planters, of which the following is a full, clear, and exact description, reference being had to the accompanying drawings, forming part of this specification.

My invention relates to potato planters of the type wherein a series of pickers are caused to revolve around a shaft over a receiver for potatoes, these pickers having prongs to impale a piece of seed potato and slotted concaves arranged in the receiver to press the potatoes on the prongs. The pickers are then caused to release the piece of seed potato by striking against a knock-off bar, said seed being delivered to the ground. In such devices there is a means for opening a furrow where the seed potatoes are to fall, and another device for closing the furrow.

The chief difficulty in the proper feeding of potatoes is that if they are not fed regularly, there is a wasting of potatoes, or else an irregular planting, owing to too many or too few being deposited from the pickers. Thus it is one of the objects of this invention to provide a hopper for receiving the seed potatoes, having a special form of agitator which works the potatoes regularly to the position for delivery to the receiver member. It is the object to so control this agitator that it works rapidly or slowly corresponding to the working of the pickers.

Another difficulty in feeding by means of pickers as above described, is that the pickers of the past have not been adjustable as to the amount of projecting prong to impale the seed, so that when small pieces of seed should be desired, too many pieces would be delivered by the pickers. It is an object of this invention to provide a means for adjusting the amount of protruding prong, to avoid the said difficulty.

These objects and other advantages to be duly noted I accomplish by that certain construction and arrangement of parts to be hereinafter more specifically pointed out and claimed.

In the drawings,

Figure 1 is a side elevation of the machine.

Fig. 2 is a top plan view thereof.

Fig. 3 is a detail front elevation of the picker.

Fig. 4 is a side elevation thereof.

Fig. 5 is a side elevation of the head of the picker, detached.

Fig. 6 is a perspective view of the operated member of the agitator plates.

Fig. 7 is a detail rear elevation showing the adjustable mounting of the cover disks.

Fig. 8 is a side elevation of the parts shown in Fig. 7.

Fig. 9 is a detail top plan view of the knock-off member.

The machine has a framework comprising a pair of converging horizontal bars 1, which are bolted to the tongue 2, at 3 and to which is suitably mounted the receiver 4 for the picker mechanism. The framework has uprights 5 for mounting the seat 6, and the uprights 7 for mounting the hopper 8. Pivoted at 10 to the forward portion of the bars 1, is a frame having the curved side bars 9, one on each side, said bars 1 being connected at the rear by the rear bar 11.

The cover disks 12 for covering over the seed potatoes are mounted on the rear bar 11 as will be described, and the main shaft 13 of the machine is journaled in the receiver 4. On this main shaft are the carrying wheels 14 of the machine, these carrying wheels serving to operate the pickers which are mounted on said main shaft.

A pivoted lever 15 working over a slotted segment 16 at the front of the machine, operates, by means of a rod 17, a clutch 18 on the main shaft of the machine located inside of the receiver 4 (Fig. 2). Another lever 19, working over a segment 20, has a connection with a rock shaft 21 at the rear of the machine which raises the rear member 11 of the frame that holds the cover disks 12. The exact construction of the parts now described forms no part of my invention, and it will be understood that any well known expedients for accomplishing the same results which are familiar in the art would be just as satisfactory.

The furrow opening disks 22 are set into a frame 23 so as to form an acute angle pointing toward the front of the machine. They are mounted on shafts 24 in said frame and have the strike-off plates 25 which are mounted on the frame bars 1. At about the middle portion of the frame 23 is pivotally connected the arm 26, which operatively connects the frame with the lever 15, which it will be remembered is used for operating the clutch on the driving shaft. Connected to the frame in front of the arm 26 is a spring 27, which serves to pull the forward portion of the frame up toward the tongue 2.

Pivotally connected to the tongue ahead of the spring is an arm 28 which has at its lower end a slot 29. A pin 30 which connects the two plates of the frame 23 is passed through this slot and thus provides a slidable pivot point for the front of the disk frame.

The means adopted for picking up pieces of seed potato in the receiver and depositing them on the ground is built on the same principle as the usual run of potato planters on the market. Bolted to the guard 38ª that is on the tongue 2 of the machine is a plate 90 which is located over a chute 39 that is so placed that it directs seed potatoes that pass down the same, into the furrow uncovered by the disks of the furrow opener now described. The securing bolt 91 of this plate serves also to mount a second or knock-off plate 92, which has a forwardly sloping top, and is resiliently held away from the plate 90 by springs 93, 93. The plate 90 has a flange 94 on which rides the like flange 95 of the plate 92, and the flange 95 is slotted so as to be guided by a stud 96 on the flange 94.

As stated, the main shaft of the machine has a clutch which is operated by the lifter for the furrow opener. When the clutch is in operative position, the disk 40 on a sleeve 41 on the shaft is caused to rotate with the said shaft. On the disk are a series of pickers having arms 42 bolted to the disk. These arms have at their upper end two plates 43, 44, spaced away from each other, the one preferably integral with the arm and the other riveted thereto at 45. A pair of flat prongs 46 spaced away from each other are mounted at the inner termination of the plates 43, 44, and pivoted between the plates at 47 is the remover plate 48.

The plate 48 extends down between the two prongs and has a rearward extension 49 which is arranged to contact with the knock-off plate, and when the pickers are put in motion and the prongs pick up a piece of potato, the knock-off plate will strike the rear end of the remover and cause it to strike off the piece of potato from the prongs. Inasmuch as the knock-off plate 92 is resilient on its spring mounting, it will allow for any jamming of the remover plate, and, moreover, it will be free from the liability to break during continued use.

As so far described, the pickers are the same as those familiar in the art. In connection with the remover plate, however, I provide means which is adjustable for different sized potatoes. A series of holes 50 are bored in the remover plate and in one of these holes, as desired, is placed a screw 51. The screw will contact with the plates 43, 44, and control the normal position of the remover plate which will fall by gravity until the said screw contacts with these mounting members 43, 44, and as a result the tongue 52 on the remover plate will lie between the prongs 46, either near or remote from the points thereof, thereby controlling the amount of prong which is free to pick up a piece of potato.

The receiver 4 into which the seed potato is delivered from the hopper as will be described is slotted for the passage of the pickers, as is the usual practice, and the prongs will pass through the mass of seed in the receiver, picking up one piece of potato, provided the prongs do not extend freely a distance long enough to allow several pieces to be picked up. By adjusting the picker as above described, it is plain that the free extension of the prongs may be easily controlled so that a regular feed can always be had.

For pressing the pieces of potato on the prongs, as is the usual practice, a pair of slotted concave members 53 are provided, the same being pivoted at the base of the receiver, and springheld in a position to press against the prongs by the springs 54. The receiver is slotted at the rear to allow the concaves to lie in the path of the pickers and said concaves are so placed that each picker as it passes up from the base of the receiver will have to pass along in the slot in the one or the other of the concaves.

As is the usual practice, the receiver is sloped toward the center and the picker disk and concaves are mounted at the median line of the receiver, the potatoes being delivered to the sides of said receiver at the rear, from thence naturally falling to the center thereof where they are in the path of the pickers.

The hopper 8 is a four sided box with a sloping base adapted to receive the seed potato chopped up ready for planting. It has a ridge 55 formed along the center line of the base, and the base 56 is slotted or cut away along each side of the ridge, this cut away portion being closed by the agitator plates. The hopper base is formed so that it will fit down over the rear expanded end of the receiver, and gates 57, 57, are provided, one at each side of the forward end of the hopper to control the size of the opening from the hopper into the receiver. The said front side of the hopper is provided with two cut away portions (not shown) which form the openings which the gates are to close, and the gates are mounted on slanting extensions 58, 58, on the front of the hopper, the said gates having a slot 59 and a bolt 60 for adjustably securing them on the said extension members.

The agitators comprise three plates, 61, a long plate that extends out through a slot in the rear of the hopper, 62, a small plate which is rocked as will be described, and is hinged to the long plate and 63, a small plate which falls over the end of the receiver and is likewise hinged to the plate 62. When the plate 62 is rocked, the hinge joints alternately rise and fall and at the same time the plates 61 and 63 are drawn toward or forced away from the center of movement of the rocking plate. This movement gives a progressive forward pushing and tipping to the mass of seed potato in the hopper as the motion is similar to three waves formed by the agitators in the base of the hopper that impel the seed toward the gates at the front end thereof.

On the sleeve 41, which it will be remembered serves as the mounting for the pickers, is mounted a sprocket 64. A shaft 65 is mounted at the upper end of the hopper and on this shaft is a loose sleeve 66 carrying a sprocket 67. A chain 68 passes over these two sprockets and the sleeve 66 is thrown into clutched position with the shaft 65 by means of a lever 69, that throws the sleeve into mesh with a fixed collar 70 on said shaft. The fixed collar has clutch teeth to mesh with like teeth on the sleeve, and the lever is mounted on a collar which is pushed against the loose sleeve by the tooth 71 thereon riding in and out of a notch formed in the housing of the shaft 65.

On the end of the shaft is a crank 72, which is connected by an arm 73 with a long crank 74 mounted on a square shaft 75 at the base of the hopper. The middle or rocking plate of the agitator has a pair of brackets 76 on its under side to engage the square shaft, and the said square shaft is journaled on a rounded portion thereof in the base of the hopper in any desired manner.

The agitator may thus be thrown into or out of connection with the picker sleeve, and it will operate at a speed regulated by the speed of operation of the pickers. The rocking plate 62 has a pair of rounded fingers 77 (Fig. 6), which contact with the under sides of the other two agitator plates that are hinged thereto, and these fingers assist in the raising and lowering portion of the two plates at the point of their hinged connection to the rocking plate.

Having thus described my invention, what I claim as new and desire to secure by Letters Patent, is:—

1. In a potato planter, a hopper therefor, and an agitator in said hopper located in the base thereof and free to slide in the hopper at its ends, and means for raising the agitator at a plurality of points progressively.

2. In a potato planter, a hopper therefor, and an agitator in said hopper located in the base thereof, and means for raising the agitator at a plurality of points progressively and simultaneously moving the same lengthwise of the hopper at a plurality of points to impart a progressive wave motion thereto.

3. In a potato planter, a hopper therefor, and agitating means located in the base of the hopper and comprising a series of plates hinged to each other, and means for rocking one of the inner plates of the series to impart motion to the series, said outer plates being free to slide in the hopper.

4. In a potato planter, a picker therefor, comprising a member having prongs for impaling a piece of potato, a means for removing said piece from the prongs movably mounted on said member, and means for regulating the normal position of the removing means to adjust the working length of the prongs.

5. In a potato planter, a picker therefor, said picker having prongs to impale a piece of potato, means for removing the potato from the prongs, a means for regulating the working length of the prongs.

6. In a potato planter, a picker therefor, comprising a member having prongs for impaling a piece of potato, a plate for removing said potato from the prongs, pivotally mounted to said member, a portion of said plate positioned between the prongs, and adjustable means for regulating the normal position of the portion of the plate located between the prongs to control the working length of the prongs.

7. In a potato planter, in combination with a series of movable picker members adapted to pick up a portion of potato, a remover member on said pickers for removing the potato therefrom, and means to contact with said remover member to operate the same, comprising a knock-off member resiliently secured to said planter.

8. In a potato planter, in combination with a series of removable picker members adapted to impale a portion of potato and carry it to a delivery point, means on the picker for removing said impaled potato, and a knock-off member to operate the removing means, resiliently mounted on the planter.

9. In combination with the pivotal remover member of a potato picker, in a planting machine, a plate to strike said remover member, comprising a transverse member spring supported on the machine so as to be resilient to the blow of the remover member.

10. In combination with the pivotal remover member of a potato picker, in a planting machine, a plate to strike said remover member, comprising a transverse member, slidably mounted and springheld on the machine so as to be resilient to the blow of the remover member.

JAMES H. IMUS.